(12) United States Patent  
Keeni (10) Patent No.: US 8,020,205 B2  
(45) Date of Patent: Sep. 13, 2011

(54) UNAUTHORIZED INFORMATION DETECTION SYSTEM AND UNAUTHORIZED ATTACK SOURCE SEARCH SYSTEM

(75) Inventor: Glenn Mansfield Keeni, Sendai (JP)

(73) Assignee: Cyber Solutions Inc., Miyagi (JP)

( * ) Notice: Subject to any disclaimer, the term of this patent is extended or adjusted under 35 U.S.C. 154(b) by 1169 days.

(21) Appl. No.: 10/588,188

(22) PCT Filed: Feb. 2, 2005

(86) PCT No.: PCT/JP2005/001524  
§ 371 (c)(1),  
(2), (4) Date: Apr. 20, 2007

(87) PCT Pub. No.: WO2005/074215  
PCT Pub. Date: Aug. 11, 2005

(65) Prior Publication Data  
US 2008/0016562 A1    Jan. 17, 2008

(30) Foreign Application Priority Data

Feb. 2, 2004 (JP) ................. 2004-025015  
Sep. 14, 2004 (JP) ................. 2004-267519  
Oct. 22, 2004 (JP) ................. 2004-307953

(51) Int. Cl.  
*G06F 11/00* (2006.01)  
*G06F 12/14* (2006.01)  
*G06F 12/16* (2006.01)  
*G08B 23/00* (2006.01)

(52) U.S. Cl. ............ 726/22; 726/23; 709/224; 370/230

(58) Field of Classification Search ............... 726/22  
See application file for complete search history.

(56) References Cited

U.S. PATENT DOCUMENTS

| 7,448,084 | B1 * | 11/2008 | Apap et al. ............... 726/24 |
| 7,478,429 | B2 * | 1/2009 | Lyon ........................ 726/23 |
| 7,526,807 | B2 * | 4/2009 | Chao et al. ............... 726/23 |
| 2004/0062199 | A1 * | 4/2004 | Lau et al. ................ 370/230 |
| 2004/0250124 | A1 * | 12/2004 | Chesla et al. ............ 713/201 |

FOREIGN PATENT DOCUMENTS

JP    2002-124996    4/2002

(Continued)

OTHER PUBLICATIONS

Yosuke Takei, et al., A Intrusion Detection and Trace using the Traffic Pattern, Technical Report of IEICE IN99-75, Nov. 18, 1999.

(Continued)

*Primary Examiner* — Taghi T. Arani  
*Assistant Examiner* — Narciso Victoria  
(74) *Attorney, Agent, or Firm* — Young & Thompson (57) ABSTRACT

A system for detecting and tracing a (D)DoS attack and identifying the attack source, which system simplifies the judgment reference to determine whether a (D)DoS attack is present. The number of source addresses of the packets transmitted via the Internet line is monitored. When the number of the source addresses has reached a predetermined number or a predetermined ratio within a predetermined time, it is judged that an unauthorized attack is present. Moreover, where the hop number of the packet is different from a hop number corresponding to the transmission source information, the packet is judged to be malicious.

11 Claims, 4 Drawing Sheets

FOREIGN PATENT DOCUMENTS

| | | |
|---|---|---|
| JP | 2002-176454 | 6/2002 |
| JP | 2002-252654 | 9/2002 |
| JP | 2003-258910 | 9/2003 |
| JP | 2003-283571 | 10/2003 |
| JP | 2003-533925 | 11/2003 |
| JP | 2004-140524 | 5/2004 |
| JP | 2005-86452 | 3/2005 |
| WO | 02/089426 | 11/2002 |
| WO | WO 01/88731 | 11/2002 |

OTHER PUBLICATIONS

Tatsuya Okawa et al., "Network anomaly Detection using Statistical clustering Method", Technical Report of in 2002-87 Sep. 24, 2002.

Tao Peng et al., "Protection form Distributed Denial of Service Attacks Using History-based IP Filtering", ICC 03 (May 11-15, 2003), vol. 1, pp. 482 to 4486.

* cited by examiner

UNAUTHORIZED INFORMATION DETECTION SYSTEM AND UNAUTHORIZED ATTACK SOURCE SEARCH SYSTEM

TECHNICAL FIELD

This invention gives details of a network attack detection system and outlines the method for tracking the origin of the attack. It also judges whether the information that has been transmitted in the communication packet headers is valid information or it is invalid information such as in (D)DoS attacks.

BACKGROUND TECHNOLOGY

Patent document 1 Japanese Patent Laid-Open No. 2003-318987 bulletin
Patent document 2 Japanese Patent Laid-Open No. 2003-234784 bulletin The Denial of Service attacks, widely observed in recent years, transmits a large volume of spurious communication packets targeted at specific enterprises and organizations to disrupt their services. Such (D)DoS attacks obstruct other regular business communications by consuming a major portion of the link bandwidth and/or the processing resources of the server. This obstructs the routine work, hinders users from accessing services, the poor response time results in longer connection hours which in turn leads to increase in invoice amounts.

A DoS attack is a method of sending a large number of unwanted packets to a target equipment. When the volume of incoming packets is more than the processing capacity of the target equipment, the equipment will not be able handle the regular communication packets from regular users. In this case the equipment is effectively disabled; users cannot access its services.

In this case, one can think of a service which monitors and records the value of the Source address field in the header part of the offending packet, refuses to receive any further packets from these offending addresses (DDoS attack sources) and also sends a termination signal to the source of the offending packet.

However, this type of a defense against DDoS becomes a problem when the attack comes from several sources Attempting to sent a "refusal to receive" to the source of each of the (D)Dos packet sources would exhaust the resources of the local host and network.

Thus by sending packets with randomly spoofed source addresses, an effective (D)DoS attack is achieved; it cannot be filtered and cannot be blocked.

In Patent-1 for example, if a very large volume of mail has been received, the To address (destination address) included in the header part of the E-mail is overwritten to allow load distribution among mail servers.

Patent document 2 adopts the procedure that only emails which have a proper reply address are judged to be valid. So all mails will be checked for valid reply addresses. The faked sources will not be able to receive replies properly and will be rejected.

DISCLOSURE OF INVENTION

The Problem that the Invention is Going to Solve

Since it is easy to spoof a source address, it is impossible to predict a large number of source addresses and handle network traffic In addition, since it is impossible to distinguish between (D)DoS attack packets regular communication packets, some threshold based detections methods are considered. But these thresholds are very sensitive to the characteristics and the state of the target network. Hence high detection accuracy cannot be expected.

Moreover, the distinction between a (D)DoS communication and normal communication is very difficult, a normal communication packet may be mistakenly judged as a (D)DoS attack packet, leading to the disconnection of a regular communication from a regular customer.

Because of the difficulty in detecting (D)DoS attacks several small-scale (D)DoS attack's remain undetected and some regular communications are misjudged as (D)DoS and terminated.

To solve the above-mentioned problems, this invention presents a system that can easily detect the presence of (D)DoS type attacks and track the origin of the attack.

Means to Solve a Problem

The invention according to claim 1 is an unauthorized information detecting system, characterized in that the number of values of some field in the header of the packet transmitted through an internet circuit is monitored, and in case the number of values of the field reaches a predetermined number or a predetermined ratio within a predetermined time, it is judged that an unauthorized attack is performed.

As the values of the field, for example, the following can be cited.

Version
Header Length
ToS
Total Length
Identification
Flag
Fragment offset
Time to Live
Protocol
Header Checksum
Source Address
Destination Address
Option
Port The number of values of some field is "n" in case there exist a1 (=first party), a2 (=second party), a3 (=third party) . . . an (=nth party) as source addresses where the values of the field can be, for example, distinguished as "source addresses".

In case the number of values of the field reaches above the number of values arbitrarily decided, it is judged that the unauthorized attack is performed. When the values arbitrarily decided reach, for example, more than K (K is, for example, the number of two or more) times the number $nt_2$ in other point of time, comparing with the number $nt_1$ in some point of time, it may be decided that the unauthorized attack exists. Note that, even in case the number of values of the field is reduced, it is often judged that the unauthorized attack exists.

The invention according to claim 2 is an unauthorized information detecting system according to claim 1, characterized in that the number of packets of some field value is monitored.

The number of packets pm are monitored together with the number of values fn of the field, and a judgment may be made by the ratio thereof. In case a ratio (fn/pm) at some point of time reaches above a randomly decided value, an unauthorized attack may be set as existing. When a ratio of (fn/pm)t1 and (fn/pm)tn2 reaches above some value, it may be judged as an unauthorized attack.

The invention according to claim 3 is an unauthorized information detecting system according to claim 1 or 2, characterized in that the values of the field are configured by a plurality of fields.

The values of the field are configured by a combination of the "source address" and the "destination address".

First, in like manner to the above, assume that there exist a1 (first party), a2 (second party), a3 (third party) . . . an (=nth party) as the source addresses.

Assuming that, with respect to ak (k=1 to n), the types of destination addresses exist mk pieces, and in this case, the number of values of the field configured by the combination of a plurality of fields is Σmk (k=1 to n).

The invention according to claim 4 is an unauthorized information detecting system according to any of claims 1 to 3, characterized in that, when the number of hops of the information on the internet circuit reaches a predetermined value or the number of hops carried by the packet corresponding to a specific field or a combination of fields changes, the relevant information is identified as unauthorized information.

The invention according to claim 5 is an unauthorized information detecting system, characterized in that, when the number of hops on the internet circuit reaches a predetermined value or the number of hops carried by the packet corresponding to a specific field or a combination of the fields changes, the relevant information is identified as unauthorized information.

The invention according to claim 6 is an unauthorized attack source searching system, characterized in that the number of values of some field in the header of the packet transmitted through an internet circuit is monitored, and in case the number of values of the field reaches a predetermined number or a predetermined ratio within a predetermined time, it is judged that an unauthorized attack is performed, and the number of values of the field is monitored at a plurality of places of the internet circuit, so that an unauthorized source is searched.

The invention according to claim 7 is an unauthorized attack source searching system according to claim 6, characterized in that the values of the field are configured by an individual combination of a plurality of fields within the header.

The invention according to claim 8 is an unauthorized attack source searching system according to claim 7, characterized in that when the number of hops of the information on the internet circuit reaches a predetermined value or the number of hops carried by the packet corresponding to a specific field or a combination of fields changes, the relevant information is identified as unauthorized information.

Effect of the Invention

According to the unauthorized information detecting system of the present invention, when the number of values of the packets in large quantities or the number of the packets reach a predetermined number within a predetermined time for the packets transmitted simultaneously in large quantities, in case the number of source addresses almost synchronously reaches a predetermined number or a predetermined ratio, the electronic mails in large quantities are judged to be (D)Dos attack mails, so that the transmission of the (D)Dos attack can be recognized or traced without making a detailed and troublesome setting such as a reception permit setting or a reception denial setting for the specific source address.

EXPLANATION OF CODES USED IN THE DIAGRAMS

1 An Internet link
2 A Transmitting computer
3 A Receiving computer
4 A communication monitor Judgment means The Best Way to Put the Invention into Practice As mentioned before, in a DoS attack a target is flooded with a large volume of unwanted and useless communication packets, which is more than the processing capacity of the target and thus rendering the target unable to process.

This DoS attack has the following features.

To prevent the target from identifying the origin, the Source address in the DoS packet header field is spoofed. To prevent the filtering of DoS packets by relating them to one or more Source addresses, the Source address field is randomly generated.

As the number of packets in a DoS attack is very large, the attack itself is detected by one of the following methods.

The first method is the method of counting the number of attack packets or illegal packets. However, it is difficult to judge which packet is illegal; the individual packets used in the DoS attack are all legal packets.

The second method is a method of counting all packets in transmission. This, includes the attack packets. An attack would likely manifest itself in an increase in network traffic. However, network traffic varies dynamically with time. Therefore, we cannot say that there is a DoS attack just because the amount of network traffic has increased. On the contrary, even if there is a DoS attack, the network traffic may not increase if the underlying link capacity is already saturated.

In the above context, the proposed method of detecting DoS attacks depends on counting the number of distinct values in the Source address field of the packet header.

If the attacker is indeed randomly spoofing the source address field in the header of the DoS attack packet, the number of distinct values observed in the Source address field will show a significant increase, irrespective of whether the total traffic increases or not.

In normal communication there are several packets for every source address whereas in DoS attacks there are likely to be no more than one packet per observed source address. This is how DoS attacks can be easily and accurately detected.

Figure 3:
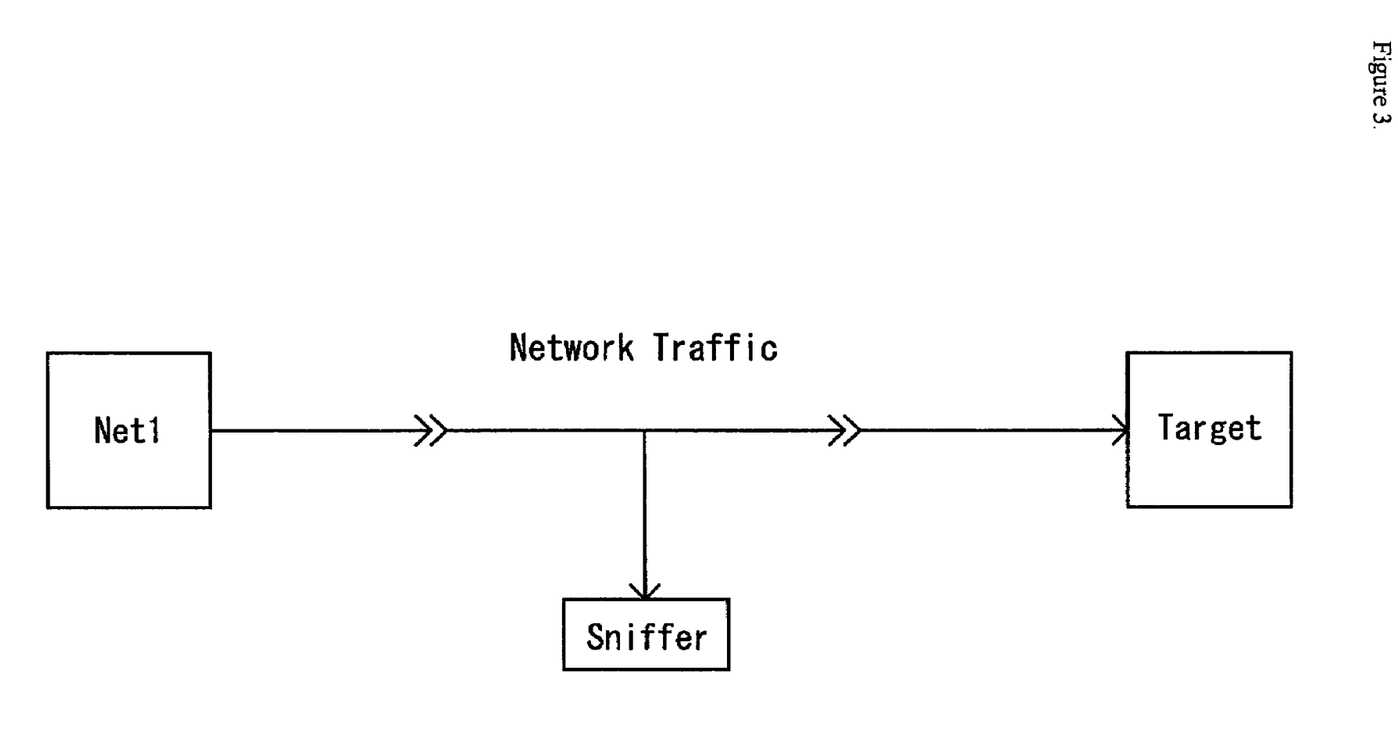
FIG. 3 This shows the conceptual diagram of a packet search.

A packet contains source address, destination address and other information. Packets are monitored at pre-specified time intervals. For example, to observe packets between network (Net1) and the attack destination (Target) a device is installed as shown in FIG. 3. Network Sniffers and passive probes are examples of such devices.

Equipment such as Sniffers and other passive probes can observe and count all packets and provide the following statistics:

Total number of packets
Number of packets having a specific source address
Number of packets having a specific destination address
Number of packets for each source address
Number of packets for each destination address
Number of packets for specific protocol types These values can be collected at regular intervals.

Next, the method for tracing the DoS attack is described.

The method of tracing the DoS attack origin will be easy if a method of checking the route of an attack packet is available. However before attempting to trace the attack packet it is necessary to know which packet is the attacking or offending (DoS) packet.

There is also the method of tracing attacks by measuring and comparing traffic patterns. However, this method is inaccurate.

In contrast, the method proposed in this invention, uses the change in the number of distinct source addresses monitored by probes in the network to trace the route of the attack. It is expected that all along the attack route a pattern similar to that in the following table will be observed.

| Time (Arbitrary unit) | Number of the packets | Number of distinct source addresses |
|---|---|---|
| 1 | 1000 | 50 |
| 2 | 800 | 60 |
| 3 | 900 | 57 |
| 4 | 1200 | 64 |
| 5 | 50 | 30 |
| 6 | 1500 | 530 |
| 7 | 1800 | 550 |
| 8 | 1700 | 570 |
| 9 | 800 | 80 |
| 10 | 900 | 65 |

In the above, the number of distinct source addresses increases with the number of packets at instants 6, 7 and 8, and DoS attack is underway there.

Figure 4:
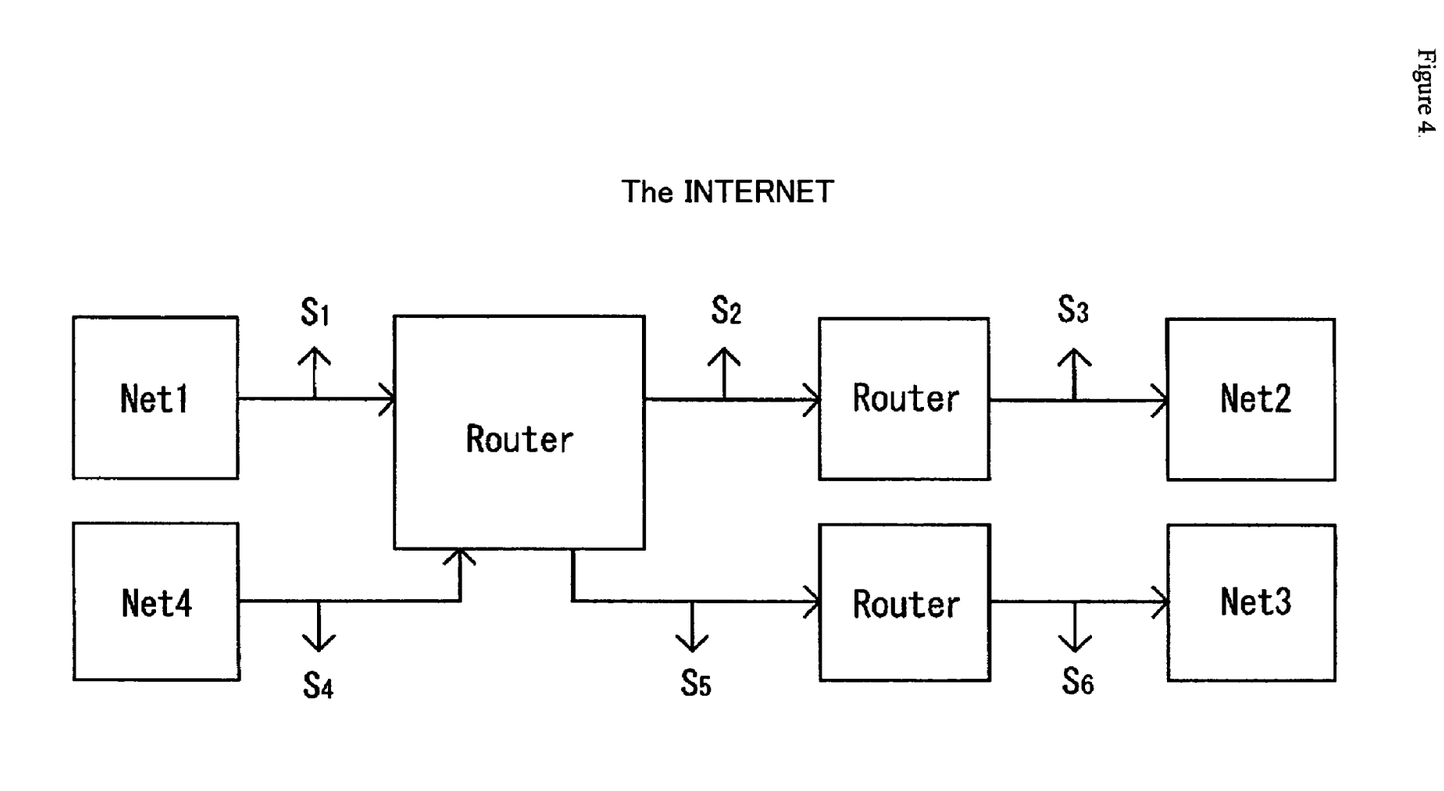
FIG. 4 This shows the conceptual diagram of the Internet.

As shown in FIG. 4, Sniffer Sn(n=1, 2, 3, . . . ) is setup on each of the network routes, and if the observation results there are compared, we can find out by which route the DoS attack occurred. If the route is traced, the DoS attack origin can be narrowed down. Depending on the situation that route can be shutdown or packets from that route can be blocked.

In this invention, using the IPv4 protocol packet as an example, the following are the header fields.

Version
Header length
ToS
Total length
Identification
Flag
Fragment offset
Time to Live
Protocol
Header checksum
Dispatch former address
Arrival address
Option
Port In the method proposed in this invention, the count of the number of distinct values for a field is monitored. It is also possible to monitor the count of the number of distinct values for an arbitrary combination of two or more of the fields.

An example is given in the following.

"Category" for a field (or a combination of fields) is a property that characterizes a packet with a distinct value in the field(s). Two packets having the same value in the field will belong to the same category. Whereas, two packets having different values in the field will belong to different categories.

(Example of category) All packets whose protocol field has value TCP

For the sake of convenience, we define the category "Total category". All packets belong to this category.

In present statistical analysis techniques, the count of all packets or, packets belonging to a certain category, monitored by a monitor or device are used as the base.

TABLE 1

| | Count of packets of each protocol | | | |
|---|---|---|---|---|
| Time | Count of All packets | Count of TCP packets | Count of UDP packets | Count of ICMP packets |
| 10:01 | 181 | 123 | 46 | 0 |
| 10:02 | 142 | 100 | 32 | 10 |
| 10:03 | 206 | 140 | 0 | 13 |
| 10:04 | 217 | 120 | 87 | 10 |

The statistical analysis using category conversion (C-Transform) is based on the number of categories that the detected packet belongs to. The table below shows the number of categories of each protocol area, in addition to the other details in the table above.

TABLE 2

| | Count of categories | | | | |
|---|---|---|---|---|---|
| Time | Count of All packets | Count of TCP packets | Count of UDP packets | Count of ICMP packets | Count of categories |
| 10:01 | 181 | 123 | 46 | 0 | 2 |
| 10:02 | 142 | 100 | 32 | 10 | 3 |
| 10:03 | 206 | 140 | 0 | 13 | 2 |
| 10:04 | 217 | 120 | 87 | 10 | 3 |

The method of making the distribution of the number of categories from the distribution of the number of packets is called category conversion "C-Transform".

The number of theoretically possible categories depends on the total length of the header fields used to determine the category. For example, the largest number of categories corresponding to a 4-bit field will be 16 (2 to the $4^{th}$ power).

However, there are fields in the header area which can take a limited number of pre defined values, like the Version and Protocol (refer to RFC 790). Not much can be concluded from gathering and analyzing the data for these fields.

On the other hand, in the case of 32-bit (4294967296) fields for example the Source address field and the Destination address field, the theoretically possible number of categories is very large, and category conversion (C-Transform) offers interesting statistics In the method proposed in this invention, when the count of the above mentioned number of categories reaches a threshold, the presence of an attack is inferred. Moreover, by effectively using the TTL information the efficiency of detection and the tracing of the attack is improved.

(Detection Method)

The number of categories, the number of packets, and the traffic are defined as follows. 1 . . . i is the time series.

The number of the categories: C1, . . . Ci, . . .
The number of the packets: P1, . . . Pi, . . .
Quantity of communication Traffic: O1, . . . Oi, . . .
The following conditions are examined $$Ci > T \quad \text{a.}$$

$$Ci/Ci+1 > T \quad \text{b.}$$

$$Ci/\{Pi|Oi\} > T \quad \text{c.}$$

T is threshold
T is a fixed value or is calculated from the traffic data.
  For example, T=F×moving Average Of Statistic (in a, b, c above)
    F is a fixed value or is calculated from the traffic data.
  For example, F=A×standard Deviation Of Statistic.
  A is a constant.

A packet is dropped from the Internet when the value of the TTL (Time to Live) field in the packet header becomes 0, to prevent packets from looping infinitly. The TTL is reduced at each HOP (hop). For a given value of the Source address field, the value of the TTL field seen at a fixed point in the network, is almost fixed, if the Source address is not faked. Therefore, by comparing the actual value of the TTL field for the given value of the Source address field, with the expected value of the TTL for that source, if there is a significant difference in the TTL value, it can be inferred that the packet is a spoofed packet.

Implementation Example

In the following, we explain the modalities of (D)DoS attack detection and attack origin tracking, with reference to diagrams.

Figure 1:
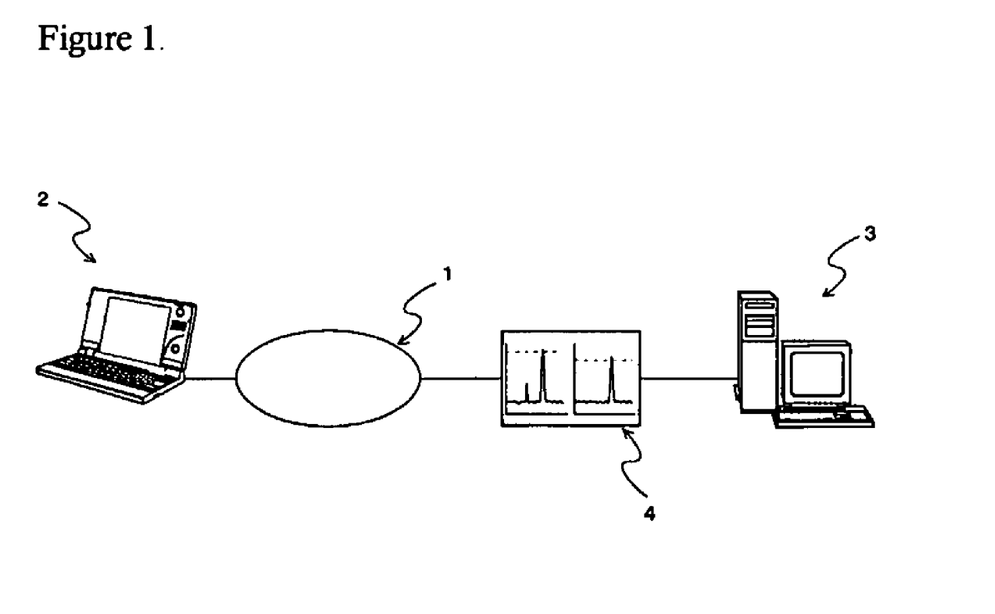
FIG. 1 This shows the conceptual diagram of the (D)DoS attack detection and tracking system outlined in this invention FIG. 2 (A) shows the format of a data in a packet, (B) is a graph showing the traffic vs. time, and (C) is a graph showing the number of distinct addresses seen vs. time.

FIG. 1 shows (D)DoS attack detection and attack origin tracking system. In this Figure, (1) is the Internet link, (2) is a computer which is connected to the Internet link (1) and acts as a source of communication, (3) is a computer that is connected to the internet link (1) and (4) is the communication monitor connected between Internet link (1) and receiving computer (3).

The communication monitor (4) is connected to the network. If the receiving computer (3) is a server, then it can itself act as the communication monitor. In this case, packets are received on a port assigned by the server. Communications with the monitor itself is not included in the monitoring. If the receiving computer (3) is a provider-owned mail server, it is connected to mail reception terminal (e.g. Personal computer) through the other internet line.

Figure 2:
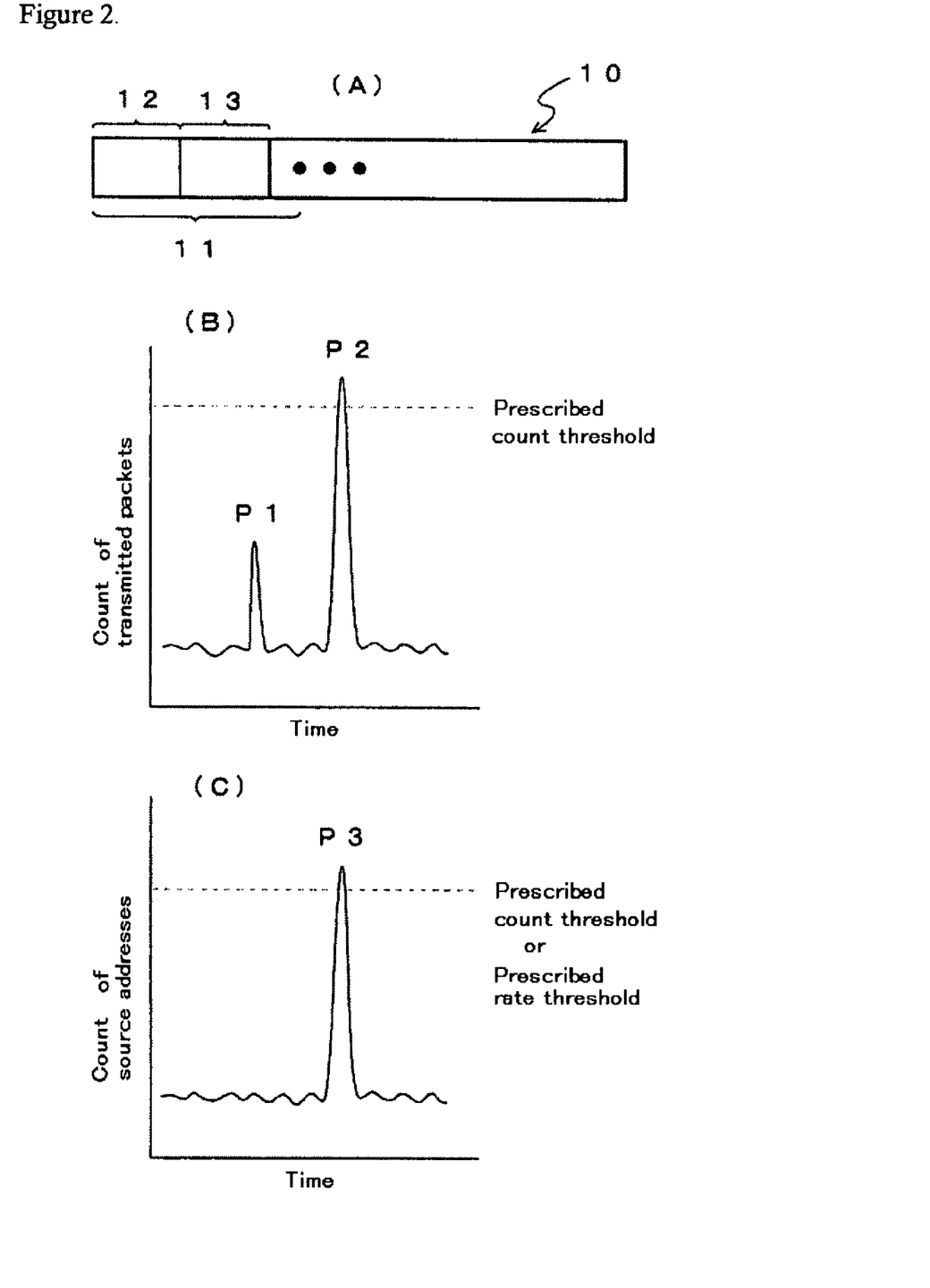

As shown in FIG. 2 (A), generally, the packets sent from the source computer (2) have Source address 12 in the Source address field and Destination address 13 in the Destination address field of the header part 11 of packet data 10 that makes up the communication Communication monitor (4) monitors the number of distinct values and/or the number of transmitted packets and the number of distinct Source addresses 12.

Suppose, for instance, in the case of normal send and received, the number of packets sent from source computer (2) to receiving computer (3) is 1. Even if other communication is sent to the receiving computer (3) at the same time from another source computer, the number of distinct values seen in Source address 12 increases by 1.

Moreover, in a regular communication there may be a large volume of traffic from the source to the destination. In this case a traditional attack detection system, that depends on the volume of network traffic, will judge that an attack is underway. This will be a wrong judgment.

This problem is especially acute in the cases of servers which host popular contents and where there are a lot of accesses from a large number of users. In such cases it is difficult to distinguish between normal operations and (D)DoS attacks. Both generate high volume traffic.

In such cases, as shown by peak P1 in FIG. 2(B), Communication monitor (4) has recorded an abnormally large amount of traffic.

However, if the values in Source address 12 are the same or belong to the same group, the communication may be accepted as normal. Or, if the number of address categories is less than a pre-specified threshold (e.g. 10) the communication may be permitted On the other hand, if a large number of packets with randomly spoofed source address (Source address 12) are sent to the receiving computer (3), even though the fact is that the packets are sent from one source computer (2), the communications traffic gets more than usual and number of distinct values seen in Source address 12 of the packets also increase on the communication monitor (4). This is shown in FIG. 2 (B) and (C)—Peak 2 & 3.

Therefore, if the communications traffic crosses a pre-specified threshold (e.g. 100) and at the same time when the number of distinct values seen in Source address 12 crosses a pre-specified threshold (e.g. 90) or the ratio crosses a threshold (e.g. 90%) then the communication may be rejected.

The value of threshold for the traffic and number of source addresses should not only be dependent on the processing capacity of the server and the capacity network, but also the type of business the network and the work station (3) is servicing.

For instance, it is well expected that in the case of a travel agency, or an Internet search service, there will be a large number of users trying to simultaneously accessing the services. This will result in the concentration of heavy traffic and server access.

Therefore, the traffic will be large on a daily basis on these businesses and the threshold has to be set accordingly high, after considering the average over a period.

There may be heavy traffic and concentrated access in normal operations which may look very similar to a (D)DoS attack. In such cases it is possible to make accurate judgment by reducing the sampling time interval.

Tracking of the origin of attack also can be done.

Moreover, even if the monitoring is being carried out at a network transit point and there is no server is in the vicinity of the network, an attack can be tracked.

What is claimed is:

1. A network attack detection system, comprising a hardware communications monitor programmed to perform the steps of:
  examining a header of a packet in transmission;
  observing values of one or more pre-specified fields in the packet header; and
  in a case where a number of distinct values observed in the pre-specified fields reaches a pre-specified threshold suggesting a pre-specified ratio within a pre-specified time interval, judging that an unauthorized attack is in progress;
  wherein the judging is carried out based on one of the following conditions where N(t) is the number of distinct values of the field observed within a pre-specified time interval from time t, $N(t_1)$ is the number of distinct values of the field observed within the pre-specified time interval from some time $t_1$, $P(t)$ is a number of packets in transmission within the pre-specified time interval from time t, $P(t_1)$ is the number of packets in transmission within the pre-specified time interval from some time $t_1$, and $T(t)$ is the number of octets or bits in the packets in transmission within the pre-specified time interval from some time t:

(a) if the ratio of $N(t)$ to $N(t_1)$ is greater than or equal to a first pre-specified threshold $k_1$, that is, if $N(t)/N(t_1) \geq k_1$, the system will judge that an attack is in progress;

(b) if the ratio of $N(t)$ to $P(t)$ is greater than or equal to a second pre-specified threshold $k_2$, that is, $N(t)/P(t) \geq k_2$, the system will judge that an attack is in progress;

(c) if the ratio of $\{N(t)/P(t)\}$ to $\{N(t_1)/P(t_1)\}$, is greater than or equal to a third pre-specified threshold k3, that is, $\{N(t)/P(t)\}/\{N(t_1)/P(t_1)\} \geq k3$, the system will judge that an attack is under progress; or (d) if the ratio $N(t)$ to $T(t)$ is greater than or equal to a fourth pre-specified threshold $k_4$, that is, $N(t)/T(t) \geq k_4$, the system will judge that an attack is in progress.

2. The network attack detection system according to claim 1, wherein the hardware communications monitor is further programmed to perform the further step of:
in a case where numbers of distinct values observed in the pre-specified fields, comprising arbitrary combinations of two or more header fields, reach a pre-specified threshold within a pre-specified time interval, judging that an unauthorized attack is in progress,
wherein the judging is carried out based on one of the above conditions (a)-(d).

3. The network attack detection system according to claim 1, wherein the hardware communications monitor is further programmed to perform the further step of:
in a case where the Time To Live (TTL) value in the header field of the packet does not lie in the range of the values seen beforehand for the source address in the header field of the packet, judging that an unauthorized attack is in progress.

4. The network attack detection system according to claim 1, wherein the hardware communications monitor is further programmed to perform the step of:
in a case where numbers of distinct values observed in the pre-specified fields comprising of arbitrary combinations of two or more header fields are greater than, or equal to, one's pre-specified threshold value within a pre-specified time interval, judging that an unauthorized attack is in progress.

5. The network attack detection system according to claim 4, wherein the hardware communications monitor is further programmed to perform the step of:
in a case where the Time to Live (TTL) value in the header field of the packet does not lie in the range of the values seen beforehand for the source address in the header field of the packet, judging that an unauthorized attack is in progress.

6. A network attack tracking system, comprising: two or more network attack detection systems,
wherein a source of the unauthorized attack is searched by deploying said two or more network attack detection systems at various places on the Internet, and
wherein each network attack detection system comprises a hardware communications monitor programmed to perform the steps of:
examining a header of a packet in transmission;
observing values of one or more pre-specified fields in the packet header; and
in a case where a number of distinct values observed in the pre-specified fields reaches a pre-specified threshold suggesting a pre-specified ratio within a pre-specified time interval, judging that an unauthorized attack is in progress;
wherein the judging is carried out based on one of the following conditions where $N(t)$ is the number of distinct values of the field observed within a pre-specified time interval from time t, $N(t_1)$ is the number of distinct values of the field observed within the pre-specified time interval from some time $t_1$, $P(t)$ is a number of packets in transmission within the pre-specified time interval from time t, $P(t_1)$ is the number of packets in transmission within the pre-specified time interval from some time $t_1$, and $T(t)$ is the number of octets or bits in the packets in transmission within the pre-specified time interval from some time t:

(a) if the ratio of $N(t)$ to $N(t_1)$ is greater than or equal to a first pre-specified threshold $k_1$, that is, if $N(t)/N(t_1) \geq k_1$, the system will judge that an attack is in progress;

(b) if the ratio of $N(t)$ to $P(t)$ is greater than or equal to a second pre-specified threshold $k_2$, that is, $N(t)/P(t) \geq k_2$, the system will judge that an attack is in progress;

(c) if the ratio of $\{N(t)/P(t)\}$ to $\{N(t_1)/P(t_1)\}$, is greater than or equal to a third pre-specified threshold k3, that is, $\{N(t)/P(t)\}/\{N(t_1)/P(t_1)\} \geq k3$, the system will judge that an attack is under progress; or (d) if the ratio $N(t)$ to $T(t)$ is greater than or equal to a fourth pre-specified threshold $k_4$, that is, $N(t)/T(t) \geq k_4$, the system will judge that an attack is in progress.

7. A method for detecting a network attack, comprising the steps of:
examining a header of a packet in transmission;
observing values of one or more pre-specified fields in the packet header; and
in a case where a number of distinct values observed in the pre-specified field reaches a pre-specified threshold suggesting a pre-specified ratio within a pre-specified time interval, judging that an unauthorized attack is in progress;
wherein the judging is carried out based on one of the following conditions where $N(t)$ is the number of distinct values of the field observed within a pre-specified time interval from time t, $N(t_1)$ is the number of distinct values of the field observed within the pre-specified time interval from some time $t_1$, $P(t)$ is a number of packets in transmission within the pre-specified time interval from time t, $P(t_1)$ is the number of packets in transmission within the pre-specified time interval from some time $t_1$, and $T(t)$ is the number of octets or bits in the packets in transmission within the pre-specified time interval from some time t:

(a) if the ratio of $N(t)$ to $N(t_1)$ is greater than or equal to a first pre-specified threshold $k_1$, that is, if $N(t)/N(t_1) \geq k_1$, the system will judge that an attack is in progress;

(b) if the ratio of $N(t)$ to $P(t)$ is greater than or equal to a second pre-specified threshold $k_2$, that is, $N(t)/P(t) \geq k_2$, the system will judge that an attack is in progress;

(c) if the ratio of $\{N(t)/P(t)\}$ to $\{N(t_1)/P(t_1)\}$, is greater than or equal to a third pre-specified threshold k3, that is, $\{N(t)/P(t)\}/\{N(t_1)/P(t_1)\} \geq k3$, the system will judge that an attack is under progress; or (d) if the ratio $N(t)$ to $T(t)$ is greater than or equal to a fourth pre-specified threshold $k_4$, that is, $N(t)/T(t) \geq k_4$, the system will judge that an attack is in progress.

8. The method according to claim 7, further comprising the step of:

in a case where numbers of distinct values observed in the pre-specified fields, comprising of arbitrary combinations of two or more header fields, reach a pre-specified threshold within a pre-specified time interval, judging that an unauthorized attack is in progress, wherein the judging is carried out based on one of the above conditions (a)-(d).

9. The method according to claim 7, comprising the further step of:

in a case where a Time To Live (TTL) value in the header field of the packet does not lie in the range of the values seen beforehand for the source address in the header field of the packet, judging that an unauthorized attack is in progress.

10. The method according to claim 7, further comprising the step of:

in a case where numbers of distinct values observed in the pre-specified fields comprising of arbitrary combinations of two or more header fields are greater than, or equal to, one's pre-specified threshold value within a pre-specified time interval, judging that an unauthorized attack is in progress.

11. The method according to claim 10, further comprising the step of:

in a case where the Time To Live (TTL) value in the header field of the packet does not lie in the range of the values seen beforehand for the source address in the header field of the packet, judging that an unauthorized attack is in progress.

* * * * *